(12) United States Patent
Dumarey et al.

(10) Patent No.: US 10,004,178 B2
(45) Date of Patent: *Jun. 26, 2018

(54) MULTI-MODE CONTROL SYSTEM FOR RECTANGULAR BALER AND RELATED METHOD

(75) Inventors: Robrecht M. K. Dumarey, Gistel (BE); Didier O. M. Verhaeghe, Ieper (BE)

(73) Assignee: CNH Industrial America LLC, New Holland, PA (US)

( * ) Notice: Subject to any disclaimer, the term of this patent is extended or adjusted under 35 U.S.C. 154(b) by 293 days.

This patent is subject to a terminal disclaimer.

(21) Appl. No.: 14/380,413

(22) PCT Filed: Feb. 23, 2012

(86) PCT No.: PCT/EP2012/053084
§ 371 (c)(1),
(2), (4) Date: Aug. 22, 2014

(87) PCT Pub. No.: WO2013/123990
PCT Pub. Date: Aug. 29, 2013

(65) Prior Publication Data
US 2015/0025757 A1    Jan. 22, 2015

(51) Int. Cl.
*A01F 15/08* (2006.01)
*A01F 15/04* (2006.01)
(52) U.S. Cl.
CPC ........ *A01F 15/0825* (2013.01); *A01F 15/046* (2013.01); *A01F 2015/0891* (2013.01)

(58) Field of Classification Search
None
See application file for complete search history.

(56) References Cited

U.S. PATENT DOCUMENTS

| | | |
|---|---|---|
| 2,796,285 A | 6/1957 | True |
| 2,796,825 A | 6/1957 | Kriegbaum et al. |
| 4,037,528 A | 7/1977 | White et al. |
| 5,123,338 A | 6/1992 | Mathis |
| 5,384,436 A | 1/1995 | Pritchard |
| 6,101,932 A | 8/2000 | Wilkens |
| 6,112,507 A | 9/2000 | Mesmer |
| 6,431,981 B1 * | 8/2002 | Shinners ................. A01F 29/09 460/6 |
| 6,530,311 B1 | 3/2003 | Wilkens et al. |

(Continued)

FOREIGN PATENT DOCUMENTS

FR    2741236 A1    5/1997
GB    2444914 A     6/2008

*Primary Examiner* — Jerrah Edwards
(74) *Attorney, Agent, or Firm* — Patrick Sheldrake

(57) ABSTRACT

A rectangular baler having a bale-forming chamber, a piston that is reciprocatable in the bale-forming chamber for compressing biomass to form bales. The dimensions of part of the interior of the bale-forming chamber are adjustable under the influence of at least one actuator the energization of which is controllable. A controller for controlling the energization of the at least one actuator is adapted for generating a least a first control signal in accordance with a target pressure mode of the baler, a second control signal in accordance with a target force mode of the baler, and a third control signal in accordance with a target weight mode of the baler.

15 Claims, 6 Drawing Sheets

(56) References Cited

U.S. PATENT DOCUMENTS

| | | | |
|---|---|---|---|
| 7,096,653 B2 * | 8/2006 | Shinners | A01F 29/09 460/6 |
| 8,539,878 B2 * | 9/2013 | Verhaeghe | A01F 15/0825 100/35 |
| 2004/0002368 A1 * | 1/2004 | Shinners | A01F 29/09 460/4 |
| 2013/0042770 A1 * | 2/2013 | Verhaeghe | A01F 15/0825 100/35 |

* cited by examiner

MULTI-MODE CONTROL SYSTEM FOR RECTANGULAR BALER AND RELATED METHOD

This application is the US National Stage filing of International Application Serial No. PCT/EP2012/053084 filed on Feb. 23, 2012, the full disclosure of which is hereby incorporated by reference.

FIELD OF THE INVENTION

The present invention generally relates to a baler for creating rectangular bales of agricultural crop material. More particularly, the present invention relates to a multi-mode control system for producing density controlled bales, e.g. substantially constant density bales, and to a related density control method.

BACKGROUND OF THE INVENTION

An agricultural baler is a trailed machine (PTM—pulled type machine) used in agriculture for the purpose of creating bales of (typically) straw or other biomass such as hay, silage or similar crop material produced during a harvesting or mowing operation.

Various designs of balers have been proposed in the prior art. A common characteristic of virtually all balers is that they are towed behind agricultural vehicles such as tractors. A baler includes an infeed via which biomass is ingested into the interior of the baler and compressed or otherwise treated to form bales. The completed bales are tied with twine to make them rigid and self-supporting and are ejected via a discharge chute typically at the rear of the baler machine so as to fall or be placed on the ground behind the tractor/baler combination as its moves forwardly along a harvested field.

In the 1970's and 1980's, so-called "round" balers were developed. These produce large cylindrical bales. Although many round balers are still sold annually and many more remain in use, in many areas their popularity has been usurped by "rectangular" or "square" balers. Such balers produce cuboidal bales that have a number of advantages over "round" bales.

The handling of rectangular bales is more convenient and is safer. Additionally as a result of the cuboidal shapes of rectangular bales it is relatively easy to transport them and stack them for temporary or long term storage in stable structures either in fields or in farmyards. Rectangular bales can be produced with a high density. When used, rectangular bales are also easily distributed as they are formed from a number of slices.

A significant advantage of rectangular balers over round balers is that it is possible to adjust the characteristics of a rectangular bale in some cases while the bale is being formed.

This is important because straw or other baled biomass is an economically valuable crop. Very often the value of baled biomass is assessed on the basis of the weight of each bale produced by the operation of the baler. It can be very important to control the density of the baled biomass in order to assure that the bale weights are substantially constant during passage of a baler from part of a field to another. Variations, however, in the characteristics (especially the moisture) of the baled biomass ingested from place to place into the baler may mean that there is a frequent or even constant need to adjust bale density during baling operations in order to meet the objective of consistent bale mass.

In a rectangular baler it is possible to adjust the bale density, as the baler includes a substantially cuboidal bale-forming chamber. It is known in the art to construct the bale-forming chamber with one or more moveable side walls. The positions of the side walls can be adjusted so as to alter the volume of the bale-forming chamber and thereby squeeze the bale during its formation to a greater or lesser degree. If, as is commonplace in a baler, each charge of ingested biomass is substantially of constant volume, causing a reduction in the volume of the bale-forming chamber in this way leads to the creation of higher density bales, and vice versa. This, in turn, provides an ability to control the densities of the formed bales.

In more detail, each charge introduced into the bale-forming chamber is, at the point of introduction, uncompressed or compressed to a relatively low level. It is moved along the bale-forming chamber by longitudinal strokes of a piston that reciprocates under the action of an attached arm that in turn is driven by a bell crank secured to a rotating member. Each stroke of the piston therefore compresses an amount of biomass against the biomass already available in the bale-forming chamber. In consequence, the density of the formed bale increases if the volume into which the biomass is swept is reduced as a result of adjustments of the positions of the sidewalls of the chamber at locations "downstream" of the furthest point reached by the piston during its motion.

The dimensions of rectangular bales, however, are substantially fixed, firstly because of the cross-sectional dimensions of the bale-forming chamber and secondly because the baler forms the biomass into identical bale lengths that are ejected via the discharge as substantially identical, individual bales.

An example of an adjustable bale-forming chamber sidewall is shown in U.S. Pat. No. 4,037,528. This disclosure describes sidewalls that are moveable under the influence of cam-like arms that are caused to rotate by attached hydraulic rams. The arrangement defines a pair of four-bar linkages each including one of the sidewalls. Operation of the associated ram therefore causes the sidewall to move inwardly or outwardly, relative to the interior of the bale-forming chamber, in an even fashion causing uniform alteration of the chamber volume over a portion of its length.

A more modern form of bale density adjustment that is suitable for inclusion in a rectangular baler is disclosed in EP0655190.

The ability to adjust the density of bales is likely to be of most use if the baler can be operated in a feedback control mode for the purpose of assessing whether the actual bale density achieved matches a target density value.

U.S. Pat. No. 2,796,825 discloses a hydraulic control system for a rectangular baler, wherein the baler can be operated in a target weight control mode. In the rectangular baler of U.S. Pat. No. 2,796,825, the output value of a weighing platform in the discharge chute is generated as an hydraulic pulse, which is used as an input command to a piston that adjusts the positions of sidewalls in a bale-forming chamber. In the baler of U.S. Pat. No. 2,796,285 therefore bale mass measurements are used to adjust bale density.

A significant drawback of the arrangement disclosed in U.S. Pat. No. 2,796,825, however, is that the weighing platform disclosed therein only generates a signal when a completed bale is stationary on it. Since it takes at least 30 seconds, and most often more, up to 120 seconds, to form a bale in even a modestly-sized rectangular baler the response frequency of the system disclosed in U.S. Pat. No. 2,796,825 is no better than 0.033 Hz and it typically would be significantly slower than this.

A tractor towing a baler across a harvested field, however, may attain a speed of perhaps 15 km/h when travelling over windrows. During the time required to form a single bale, therefore, the tractor/baler combination will travel at least 200 meters. The characteristics of e.g. cut straw lying in a field on the other hand may vary significantly over a distance of one meter or less. The bale weight signals generated using the apparatus of U.S. Pat. No. 2,796,825, being updated say once every 50 seconds, are relatively unlikely to be capable of taking account of such variations.

Another way to control the density of bales created by a rectangular baler is disclosed in co-pending application BE2010/0081. The baler has a bale-forming chamber from which part of the dimensions are adjustable under influence of at least one actuator coupled to a hydraulic circuit. The baler furthermore comprises a controller which allows to operate the baler in a feed-back density control mode. The control mode of the described baler comprises three nested control loops, wherein the loop frequency of the middle control loop is higher than the loop frequency of the outermost control loop and lower than the loop frequency of the innermost control loop. The innermost control loop is a target pressure loop which compares a target pressure value to a measured value of the pressure in the hydraulic circuit of the baler. The middle loop is a target force loop which compares a target force value to a measured value of the force applied by the baler piston. The outermost loop is a target weight loop which compares a target weight value of an individual bale to the measured weight of a finished bale. The described control system is a high-frequency control system which increases the precision of the weight of the resulting bale and automatically takes account of biomass parameter variations during bale formation.

Several other ways to control the density of bales created by a rectangular baler are known in the prior art. Often, the baler is operational in several control modes, for example in a target weight control mode and a target pressure control mode. In the known prior-art methods, the operator, however, is only able to select one of the control modes, while depending on the circumstances neither of them alone might be ideal.

SUMMARY OF THE INVENTION

It is an object of embodiments of the present invention to provide a good control system in which the various control modes of the baler can be mixed, thereby offering nearly infinite possibilities to adapt the density control logic according to specific circumstances.

The above objective is accomplished by a method and device according to the present invention.

Particular and preferred aspects of the invention are set out in the accompanying independent and dependent claims. Features from the dependent claims may be combined with features of the independent claims and with features of other dependent claims as appropriate and not merely as explicitly set out in the claims.

In a first aspect, the present invention provides a rectangular baler comprising a biomass feeder duct connected to a bale-forming chamber, a piston that is reciprocatable in the bale-forming chamber in order to compress biomass fed into the bale-forming chamber via the biomass feeder duct to form bales and a bale discharge, the dimensions of part of the interior of the bale-forming chamber being adjustable under the influence of at least one actuator the energization of which is controllable, and a controller for controlling the energization of the at least one actuator. The controller is adapted for generating a least a first control signal in accordance with a target pressure mode of the baler, a second control signal in accordance with a target force mode of the baler, and a third control signal in accordance with a target weight mode of the baler. The target pressure mode is adapted for using a measured pressure value of a pressure sensor to generate the first control signal, the target force mode is adapted for using a measured force value of a force sensor to generate the second control signal, and the target weight mode is adapted for using a measured weight value of a weight sensor to generate the third control signal. The rectangular baler is characterized in that the controller is adapted for determining a final control signal from at least the first control signal and a weight factor associated therewith, the second control signal and a weight factor associated therewith and the third control signal and a weight factor associated therewith, the final control signal being for use to control the energization of the at least one actuator of the rectangular baler. By making a combination of the first, second and third control signals for generating the final control signal, and attributing weights to the control signals, control strategies can be mixed, thereby offering numerous alternatives to deal with situations where state of the art choices of control systems fall short.

In a rectangular baler according to embodiments of the present invention the sampling frequency of the pressure sensor may be higher than the sampling frequency of the force sensor, and the sampling frequency of the force sensor may be higher than the sampling frequency of the weight sensor. By having different sampling frequencies, the sensors provide measurement values at different rates. A faster measurement rate due to a faster sampling frequency allows to faster change the corresponding control signal. This is particularly important to balers incorporating a weighing system which measures the weight of a finished bale as there is a significant time lag as the weight can only be determined after producing a complete bale and in many cases for control purposes there is needed a weighted average of multiple bales in order to achieve a reliable value.

In embodiments of the present invention, the controller may be adapted for determining the final control signal from at least the first, the second and the third control signal and their associated weight factors, such that the sum of the associated weight factors is 100%. The weight factors can be determined by a setting by the user. As an example, if a user decides to work in manual mode only, the weight factor of the first control signal can be set at 100%, and the weight factors of the second and third control signals can be set at 0%. In mixed-mode implementation, different combinations of first, second and/or third control signals can be made.

The controller may be such that the weight factors associated with the at least first, second and third control signals are fixed during operation of the baler. This provides a fixed mode of operation. Alternatively, the controller may be such that the weight factors associated with the at least first, second and third control signals vary over time during operation of the baler. This way, for example a gradual shift from one control system to another can be achieved. For example at start-up with an empty baling chamber, a target pressure mode could be applied until the baling chamber is filled with enough material. If sufficient material is available to cause reliable readings on the force sensor a gradual shift to a target force mode can be applied. Finally, as sufficient bales have been weighed to achieve a reliable weight measurement, a gradual shift to the target weight mode can be carried out.

In embodiments of the present invention, a loop frequency of the target pressure mode, a loop frequency of the target force mode and/or a loop frequency of a target weight mode may be different from one another. This means that the first, second and/or third control signals may be generated at different frequencies.

In a second aspect, the present invention provides a multi-mode control system for controlling the density of bales formed by a rectangular baler. The multi-mode control system comprises a controller for generating a final control signal for controlling the energization of at least one actuator for adjusting the dimensions of part of the interior of a bale-forming chamber of a baler. The multi-mode control system is characterized in that the controller is adapted for determining a final control signal from at least a first control signal generated in accordance with a target pressure mode of the baler and a weight factor associated therewith, a second control signal generated in accordance with a target force mode of the baler and a weight factor associated therewith, and a third control signal generated in accordance with a target weight mode of the baler and a weight factor associated therewith, whereby the target pressure mode uses a measured pressure value of a pressure sensor to generate the first control signal, the target force mode uses a measured force value of a force sensor to generate the second control signal, and the target weight mode uses a measured weight value of a weight sensor to generate the third control signal.

In a multi-mode control system according to embodiments of the present invention, the sampling frequency of the pressure sensor may be higher than the sampling frequency of the force sensor, and the sampling frequency of the force sensor may be higher than the sampling frequency of the weight sensor.

In embodiments of the present invention, at least one of the target pressure mode, the target force mode and the target weight mode may be a single loop mode. In particular embodiments, at least one of the target pressure mode, the target force mode and the target weight mode may comprise a set of nested control loops, wherein the control loop frequency of the nested control loops decreases from the innermost loop towards the outermost loop.

The first control signal may be generated by comparing a target pressure value to the measured pressure value, the second control signal may be generated by comparing a target force value to the measured force value, and the third control signal may be generated by comparing a target weight value to the measured weight value.

In embodiments of the present invention, the control loop frequency of at least one of the target pressure mode, the target force mode and the target weight mode may be different from that of the other control modes.

In embodiments of the present invention, the sampling frequencies of the target pressure mode, the target force mode and the target weight mode may be the same.

In particular embodiments, the target pressure mode may be a single loop mode, the target force mode may comprise a target pressure loop nested in a target force loop, the control loop frequency of the target pressure loop being higher than the control loop frequency of the target force loop, and the target weight mode may comprise a target pressure loop nested in a target force loop nested in a target weight loop, the control loop frequency of the three nested control loops of the target weight mode increasing from the innermost loop towards the outermost loop. The target pressure loop of the target force mode and the target weight mode may use the measured pressure value of the pressure sensor, wherein the target force loop of the target weight mode uses the measured force value of the force sensor.

In a multi-mode control system according to embodiments of the present invention, the weight factors may be fixed during operation of the baler. In alternative embodiments, the weight factors may be varied during operation of the baler.

In particular embodiments of the present invention, the final control signal may be generated using the equations:

$$\begin{cases} PWM_{final} = X \cdot PWM_1 + Y \cdot PWM_2 + Z \cdot PWM_3 \\ \quad\quad X + Y + Z = 100\% \end{cases},$$

In a third aspect, the present invention provides a method for controlling creation of constant density bales by means of a baler. The method comprises the steps of:

generating at least a first control signal, a second control signal and a third control signal in accordance with a target pressure mode, a target force mode and a target weight mode, respectively, of the baler, associating a first weight factor with the first control signal, a second weight factor with the second control signal, and a third weight factor with the third control signal, determining a final control signal from the first, the second and the third control signals and their associated weights, and using the final control signal for controlling the density of bales created by baler.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Figures 1, 2:
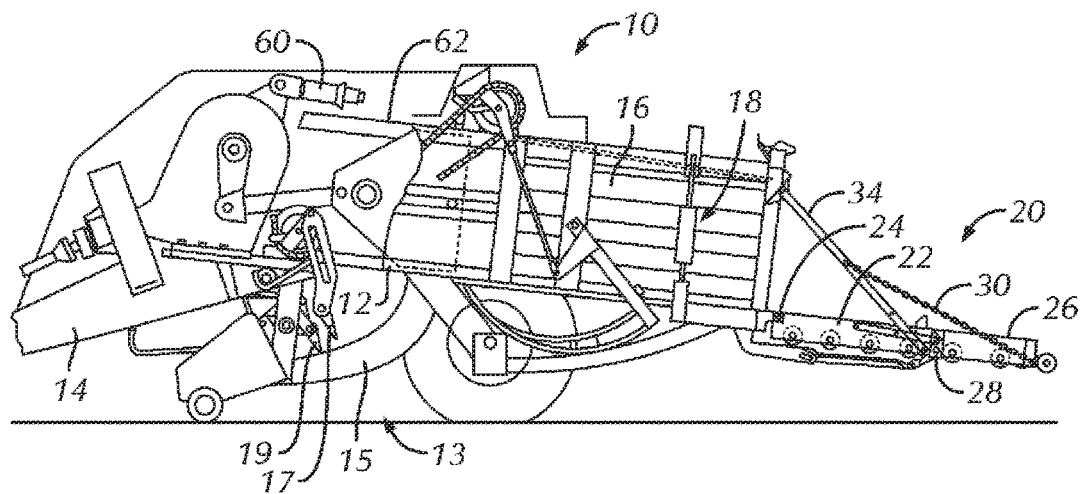
FIG. 1 is a schematic, vertically sectioned view of a typical rectangular baler.
FIG. 2 shows in more detail the bale discharge area of the baler of FIG. 1.

The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

Referring to the drawings, FIG. 1 and FIG. 2 show a prior art agricultural baler 10 comprising a frame 12 which is equipped with a forwardly extending tongue 14 at its front end with hitch means (not shown) for coupling the baler 10 to a towing tractor. A pick-up assembly 13 lifts windrowed crop material off the field as the baler 10 is travelled thereover and delivers such material into the front end of a rearwardly and upwardly curved, charge-forming feeder duct 15. The duct 15 communicates at its upper end with an overhead, fore-and-aft extending bale-forming chamber 16 into which crop charges are loaded by a cyclically operating stuffer mechanism 17. A continuously operating packer mechanism 19 at the lower front end of the feeder duct 15 continuously feeds and packs material into the duct 15 as to cause charges of the crop material to take on and assume the internal configuration of the duct 15 prior to periodic engagement by the stuffer 17 and insertion up into the bale-forming chamber 16. The feeder duct 15 may be equipped with means (not illustrated) for establishing whether a complete charge has been formed therein and operating the stuffer mechanism 17 in response thereto. Each action of the stuffer mechanism 17 introduces a "charge" or "flake" of crop material from the duct 15 into the chamber 16.

A plunger 62 reciprocates in a fore-and-aft direction within the bale-forming chamber 16. Biomass fed via the feeder duct 15 is thereby compacted so as to form bales in the above-described operation of the device 10. A sensor 60 is configured to measure the force exerted by the plunger 62 in the bale-forming chamber 16 on each forward stroke of the plunger, as known from for example EP0655190. Rectangular bales are formed and tied in the bale-forming chamber 16 in a conventional manner and the bales are discharged from the rear end of the bale-forming chamber 16 onto a discharge in the form of a chute, generally designated 20.

The chute 20 may be formed in two portions, namely a front portion 22 that is pivoted about an axis 24 located at the rear end of the frame 12, and a rear portion 26 that is pivotable relative to the front portion 22 about an axis 28. In the unloaded position, shown in the figures, the bale-supporting surfaces of both portions 22 and 26 are coplanar and inclined at a small angle to the horizontal, e.g. an angle of approximately 6 deg. to the horizontal. If dropped from a height onto the ground, bales can be damaged and the purpose of the pivoting rear portion 26 is to lower the bales more gently onto the ground.

When the weight of a bale rests on the rear portion 26 of the bale chute 20, the latter pivots clockwise, as viewed, to lower its trailing end closer to the ground. In this way the bale slides off the rear portion 26 without any risk of the bale toppling.

The rear portion 26 of the bale chute 20 is supported, for example on each side of the baler 10, by a towing mechanism, such as a tow or a chain 30, connected at its other side to an elbow joint 32 between two arms 34 and 36 that are secured to one another via an articulated joint. In the raised position of the rear portion 26, as shown e.g. in FIG. 2, the two arms 34 and 36 are held in a straight line.

When the rear portion 26 of the chute 20 is in the pivoted position described (i.e. when the mass of a bale is completely supported on portion 26), the rear end of the bale (i.e. towards the bale-forming chamber 16) is raised from the front portion 22 of the chute and substantially all its weight is supported by the rear portion 26 of the chute 20. Measurement elements, such as at least one transducer or at least one load beam or at least one load cell 26c, in the rear portion 26 measure the weight of the bale resting upon this rear portion 26. Because the bale is tilted, there is minimal contact between the bale being weighed and the succeeding bale acting to push it off the chute 20. The combination of these factors increases the accuracy of the measured weight signal, and thus the measurement value of the weight of the bale. Furthermore, there is ample time to take the required measurement because the bale remains supported in the described fashion from the time that its centre of gravity has passed the point where its weight is sufficient to pivot the rear portion 26 into the inclined position, until the instant when the rear end of the bale touches the ground. If several measurements are taken, filtering of electronic signals may be used to minimize errors caused by the chute 20 being jogged up and down as the baler 10 is towed over uneven ground.

The dimensions of part of the interior of the bale-forming chamber 16 are adjustable. In particular, two opposed sidewall portions of the bale-forming chamber 16 may be moveable under the influence of (in the embodiment shown) a pair of hydraulic actuators 18 comprising rams 72, 74 that are best shown schematically in FIG. 3.

Each ram 72, 74 includes a respective output shaft 76, 78 that is connected to a sidewall portion that is moveable inwardly and outwardly under the influence of the rams in order to decrease and increase the formation pressure acting on the biomass during bale forming operation. Through this means it is possible to adjust the density of the formed bales, by squeezing the biomass to a chosen degree during bale forming.

The rams 72, 74 may be connected in an hydraulic circuit 40 (FIG. 3) for actuation thereof. As an example, the present invention not being limited thereto, the hydraulic circuit 40 illustrated in FIG. 3 comprises a tank 42 with hydraulic fluid, for example an oil tank, a filter 44 for filtering the hydraulic fluid, a pump 46 for pumping the hydraulic fluid from the tank 42 through the hydraulic circuit 40, a settable restriction valve for letting hydraulic fluid pass depending on the measured signal from a hydraulic pressure sensing device 52, e.g. a proportional solenoid valve 48, and a deflecting valve 50 deflecting the flow of the hydraulic fluid for activating or de-activating the rams 72, 74. Elements of the hydraulic circuit 40 form a loop, with an input 37 from the tank 42 and an output 38 towards the tank 42. The loop comprises the restriction valve 48 for determining the pressure of the hydraulic fluid in the loop, and the deflecting valve 50 for determining whether or not the rams 72, 74 are activated. One configuration of connection of the above elements of the hydraulic circuit 40 is illustrated as an example in FIG. 3. A hydraulic pressure sensing device is shown schematically as a pressure gauge 52 in FIG. 3, but in practice the sensing device may take a range of possible forms.

Figure 3:
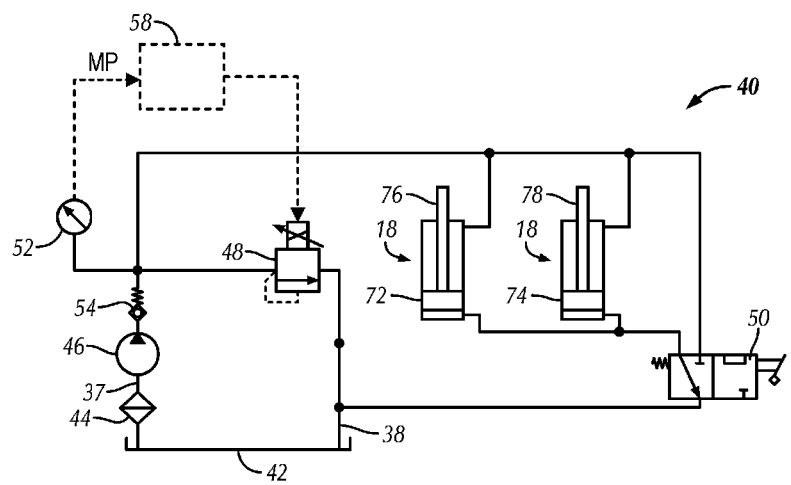
FIG. 3 is a schematic representation of an hydraulic control circuit for a baler such as that shown in FIGS. 1 and 2.

It will be apparent that by adjusting the setting of the settable restriction valve 48 the pressure in the hydraulic circuit 40 may be set when the deflecting valve 50 is in a position for activating the rams 72, 74, e.g. as shown in FIG. 3. When for example the hydraulic rams 72, 74 need to be de-activated, for example for performing a bale eject at the end of a job, the deflecting valve 50 may then be operated to its other position in order to de-activate the rams 72, 74 in order to open the moveable sidewalls and relieve the pressure from the bale inside the bale-forming chamber 16. An optional feature of the FIG. 3 circuit 40 is a one-way valve 54 as shown, preventing hydraulic fluid to flow back into the tank 42.

The pressure gauge 52 lies immediately downstream of the one-way valve 54 and is representative of a sensor or other transducer the purpose of which is to generate a signal that is indicative of the pressure in the circuit 40.

According to embodiments of the present invention, the baler 10 is adapted to control the pressure acting on the biomass during bale formation by means of a combination of at least a target weight mode, a target force mode and a target pressure mode. For each control mode, a Pulse Width Modulated (PWM) value is generated by means of a controller 58 and may be sent to the proportional solenoid valve 48 for a controlled adjustment of the pressure in the hydraulic circuit 40 of the baler 10.

FIG. 4 to FIG. 8 schematically illustrate various possible control modes of a rectangular baler 10 that may be used in combination according to embodiments of the present invention. The control modes are illustrated as block diagrams of closed loop feedback systems. For each control mode, the controller 58 generates a PWM output value by comparing a target value of a baler operating parameter to a measured value as obtained by a baler sensor.

Figure 4:
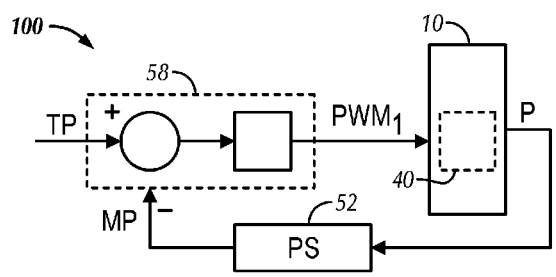
FIG. 4 to FIG. 8 are schematic representations of several possible control modes of a baler used in combination according to embodiments of the present invention.

A first embodiment of a target pressure mode 100 of a baler 10 is illustrated in FIG. 4. In the target pressure mode 100, a target pressure value TP, for example a target value for the pressure in the hydraulic circuit 40 of the baler 10, is compared in controller 58 to a measured pressure value MP, for example to the measured pressure value MP of the pressure in the hydraulic circuit 40 as represented by the output signal of a pressure sensor PS. This may for example be the output signal of pressure gauge 52. The difference signal resulting from this comparison is then converted to a first PWM output value PWM1 of the controller 58, which may be supplied to the settable restriction valve, e.g. proportional solenoid valve 48, of the hydraulic circuit 40. This may lead to a controlled adjustment of the hydraulic actuators 18 in order to attain the actual pressure P, which is as close as possible and preferably equal to the target pressure TP. A feed-back loop is provided for adjusting the pressure P in the hydraulic circuit 40 so as to make it equal to the target pressure TP. Preferably, the frequency by which the PWM1 value is generated in accordance with the target pressure mode 100 of the baler 10, i.e. the control loop frequency of the target pressure mode 100, may be chosen such that a regular update of the pressure in the hydraulic circuit 40 is obtained. For example, the control loop frequency of the target pressure mode may be chosen such that the PWM output value generated by controller 58 is updated with a frequency of 5 Hz or higher. A control loop frequency of 5 Hz provides a bale density update resolution of approximately one meter when the baler 10 is being towed at 15 km/h. Such a resolution is deemed to be adequately high as to take account of changes in biomass characteristics and to acceptably control the bale density, without requiring complex or expensive very high frequency processing circuits. Other control loop frequencies, however, are possible within the scope of the invention. The control loop frequency of the target pressure mode 100 may correspond to a sampling frequency of the pressure sensor PS.

Not shown in FIG. 4 are means for setting a target pressure TP by the operator, for determining a target value for the pressure in the hydraulic circuit 40. Such means are generally known in the art and could comprise any input device such as for example a touch screen, a keyboard or a potentiometer or an encoder for inputting a value to the controller 58 of the baler 10.

Figure 5:
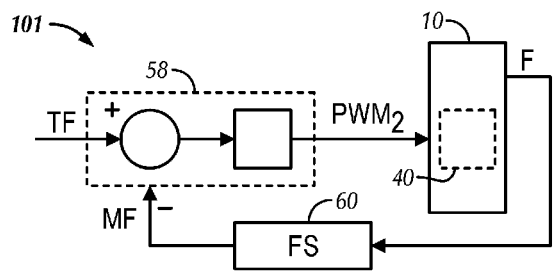

A baler 10 according to embodiments of the present invention combines the above mentioned target pressure mode with a target force mode, wherein the density of the formed bales may be controlled by comparing a target force value TF to a measured force value MF. One possible embodiment of a target force mode 101 is illustrated in FIG. 5. When operating in target force mode 101, the target value as input by the operator may for example be a target force value TF for the force applied by the plunger 62 on the biomass during operation of the baler 10. The target force value TF is then compared in controller 58 to a measured force value MF generated or obtained by a force sensor FS. The force sensor FS may for example be sensor 60 configured to measure the force exerted by the plunger 62 in the bale-forming chamber 16 on each forward stroke of the plunger 62. The signal resulting from this comparison is then further conditioned in controller 58 to a second PWM output value PWM2 of the controller which may be used as a second possible control input value for the hydraulic circuit 40 of the baler 10. This may lead to a controlled adjustment of the rams 72, 74 in order to attain the actual force F, which is as close as possible and preferably equal to the target force TF. A feed-back loop is provided for adjusting the force F applied by plunger 62 so as to make it equal to the target force TF. According to embodiments of the present invention, the force measurement carried out by force sensor 60 may take place at a sample frequency of approximately 0.8 Hz corresponding to reciprocation of the plunger 62 in the bale-forming chamber 16. Hence, the frequency by which the PWM2 value is generated in accordance with the target force mode 101 illustrated in FIG. 5, i.e. the control loop frequency of the target force mode 101, is lower than the control loop frequency of the target pressure mode 100 illustrated in FIG. 4, which is, as discussed above, for example 5 Hz or higher. Other sampling frequencies, however, are possible within the scope of the present invention.

Figure 6:
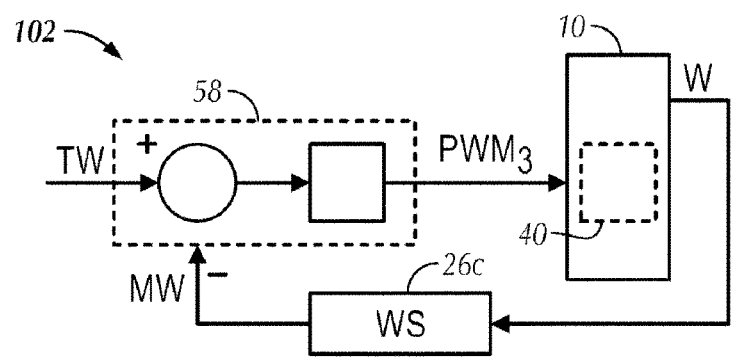

A baler 10 according to embodiments of the present invention furthermore combines the target pressure mode and target force mode with a target weight mode, wherein the density of the formed bales may be controlled by comparing a target weight value TW to a measured weight value MW. One possible embodiment of a target weight mode 102 is illustrated in FIG. 6. When operating in target weight mode 102, the target value as input by the operator may for example be the target weight TW of a single bale produced by baler 10. The target weight value TW may then be compared in controller 58 to the measured weight value MW of a completed bale as measured by weight sensor WS. The measured weight value MW may for example be represented by the output signal of a load cell 26c that is, as described above, preferably located in the bale chute 20, for example in the rear portion 26 thereof. The difference signal is then conditioned in controller 58 to a third PWM output value PWM3, which may be used as a third possible control input value for the hydraulic circuit 40. This may lead to a controlled adjustment of the rams 72, 74 in order to attain the actual weight W, which is as close as possible and preferably equal to the target weight TW. A feed-back loop is provided for adjusting the weight W of a bale formed so as to make it equal to the target weight TW. Of course, once a bale has left the bale-forming chamber 16 and is measured, changes to the settings of the target weight mode 102 only will have effect on a next bale being formed. The frequency by which the PWM3 value is updated, i.e. the control loop frequency of the target weight mode 102, may be determined by the frequency by which the bales are produced, hence by the sample frequency of the weight sensor WS. As an example, assuming a new bale being formed every 50 seconds, the control loop frequency of the target weight mode 102 may be approximately 0.02 Hz. In an alternative embodiment, the measured weight value MW may be chosen to be the weighted mean of the weight of a number of subsequently produced bales. For this particular embodiment, the control loop frequency of target weight mode 102 will be lower than the sampling frequency of the weight sensor WE, e.g. lower than 0.02 Hz.

In the embodiments of FIG. 4, FIG. 5 and FIG. 6, the illustrated control modes comprise a single control loop, wherein a PWM output value is generated at a control loop frequency, using a single sensor to measure a baler operating parameter at a sampling frequency. In embodiments of the present invention, the control loop frequency may be equal to the sampling frequency of a corresponding sensor. In alternative embodiments, the control loop frequency may be smaller than the sampling frequency of the corresponding sensor.

Figure 7:
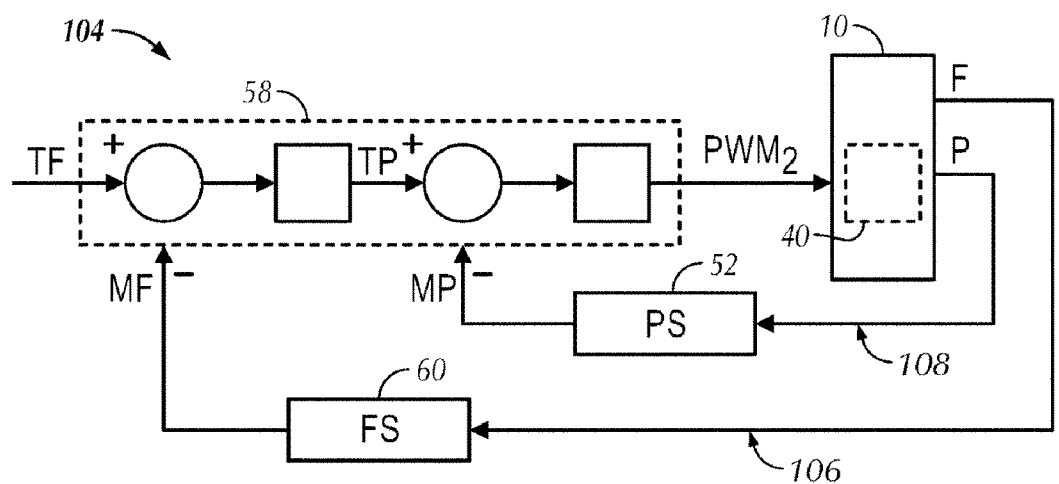

In an alternative embodiment of a baler 10 according to the present invention, at least one of the target pressure mode, the target force mode or the target weight mode of the baler 10 may comprise at least two nested control loops, wherein both control loops use a different sensor to measure a baler operating parameter, optionally at different sampling frequencies. FIG. 7 schematically illustrates an alternative embodiment of a target force mode 104 of a baler 10 according to embodiments of the present invention. The target force mode 104 now comprises a first control loop 106 and a second control loop 108, wherein the second control loop 108 is nested in the first control loop 106. According to embodiments of the present invention, the control loops 106 and 108 may be chosen such that the control loop frequency of the innermost loop 108 is higher than the control loop frequency of the outermost loop 106. For example, the first control loop 106 of control mode 104 may be a target force loop, wherein a target force value TF is input by the operator. The target force value TF may for example be a target value for the force applied by the plunger 62 during operation of the baler 10. The target force value TF is then compared in controller 58 to a measured force value MF generated by a force sensor FS. The force sensor FS may for example be sensor 60 configured to measure the force exerted by the piston 62 in the bale-forming chamber 16 on each forward stroke of the piston 62. The signal resulting from this first comparison is then further conditioned in controller 58 to a target input value of the second control loop 108. As an example, the second control loop 108 may be a target pressure loop, wherein the conditioned difference signal generated by the first control loop 106 is used as a target pressure value TP for the second control loop 108. The target pressure value TP may then be compared with a measured pressure value MP generated by a pressure sensor PS, for example by pressure gauge 52. The resulting pressure difference signal of the target force mode 104 is converted to a second PWM output value PWM2 of the controller 58 which may be supplied to the settable restriction valve, e.g. proportional solenoid valve 48, for controlled adjustment of the rams 72, 74 in accordance with operation of the hydraulic circuit 40.

According to embodiments of the present invention, the force measurement carried out by force sensor 60 may take place at a sampling frequency of approximately 0.8 Hz corresponding to reciprocation of the piston 62 in the bale-forming chamber 16. Hence, the measurement frequency, and thus the control loop frequency of the first control loop 106 is lower than the control loop frequency of the second control loop 108, which is, as discussed above, for example 5 Hz or higher. Other sampling frequencies, however, are possible within the scope of the invention. In particular embodiments, the settable restriction valve may be an analog valve which continuously keeps the pressure constant to a target pressure, in which case the control loop frequency of the second loop 108 is virtually infinite.

A baler 10 according to embodiments of the present invention may be operational in any control mode involving nested control loops wherein the control loop frequency decreases from the innermost control loop towards the outermost control loop. Rather than a target force mode involving a target pressure loop nested in a target force loop, the baler 10 may for example also be operational in a target weight mode involving two nested loops, the outermost loop being a target weight loop with a control loop frequency of approximately 0.02 Hz and the innermost control loop being a target pressure loop with a control loop frequency of 5 Hz or higher.

Figure 8:
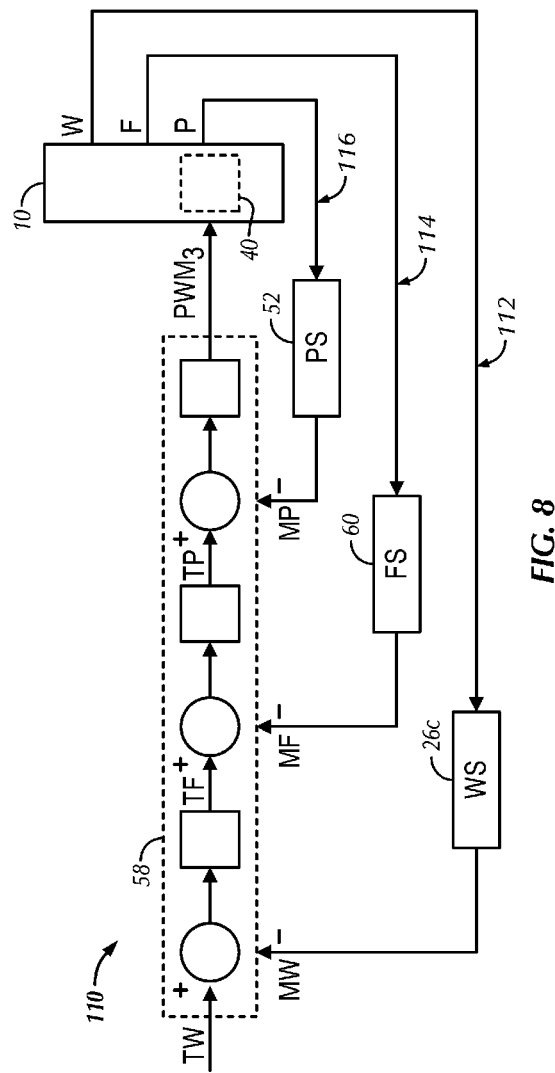

FIG. 8 shows yet another alternative embodiment of a target weight mode 110 of a baler 10 according to embodiments of the present invention. The target weight mode 110 comprises a first control loop 112, a second control loop 114 and a third control loop 116. Each control loop 112, 114, 116 involves a different sensor to measure a baler operating parameter, optionally at different sampling frequencies. The three control loops 112, 114, 116 are nested, with the control loop frequency of the second control loop 114 being lower than that of the third control loop 116 and higher than that of the first control loop 112. The first control loop 112 is a target weight loop, wherein a target weight value TW for a single bale produced by baler 10 is input by the operator. The target weight value TW may then be compared with the measured weight value MW of a completed bale as represented by the output signal of a first sensor WS, for example by the output signal of load cell 26c. The resulting difference signal is fed forwardly via controller 58 which conditions the weight difference signal to a target input value for the second control loop 114, at a first control loop frequency. According to embodiments of the present invention, the second control loop 114 is a target force loop, where the difference signal of the first control loop 112 is used as a target force value TF for comparison with an actual measured force value MF generated by a second sensor, force sensor FS. The second sensor FS may for example be force sensor 60, configured to measure the force exerted by the piston 62 in the bale-forming chamber 16 on each forward stroke of the piston. The signal resulting from the second comparison is then further conditioned in controller 58 to a target input value for the third and innermost control loop 116, at a second control loop frequency higher than the first control loop frequencies. According to embodiments of the present invention, the third control loop 116 is a target pressure loop, where the difference signal of the second control loop 114 is used as a target pressure value TP for comparison with a measured pressure value MP generated by a third sensor PS. The third sensor PS may for example be pressure gauge 52, configured to measure the pressure in the hydraulic circuit 40. The resulting pressure difference signal generated by the target weight mode 110 of the baler 10 at a third control loop frequency higher than the second control loop frequency may then be used as a control input PWM3 (following further conditioning as necessary in controller 58) for the hydraulic circuit 40, which may cause an adjustment of the rams 72, 74.

As a numeric example, the control loop frequencies of the various control loops of the target weight mode 110 as illustrated in FIG. 8 may for example be approximately 0.02 Hz for the target weight loop 112, 0.8 Hz for the target force loop 114, and 5 Hz for the target pressure loop 116. It will be apparent that the control loop frequency of the pressure measurements is adequately high as to take account of changes in biomass characteristics that would otherwise adversely influence bale density and hence (for fixed bale sizes) bale masses in a fashion that is adverse to e.g. the farmer wishing to have the bales valued on the basis of their mass. By using the relatively low sampling frequency output of the weight sensor, e.g. first sensor 26c, to generate a target force signal TF and using the output of the second sensor, e.g. force sensor 60, to generate a target pressure signal TP, operating a baler 10 according to embodiments of the present invention in a target weight mode as illustrated in FIG. 8 may increase the precision of the weight of the resulting bale.

According to embodiments of the present invention, the baler 10 is operational in at least three different control modes, this means a target pressure mode, a target force mode and a target weight mode, wherein each control mode generates a PWM output value which may be used as a control input for the hydraulic circuit 40 of the baler 10. The control modes of the baler 10 may be any of the control modes as described herein, although embodiments are not limited hereto. According to embodiments of the present invention, the control modes of the baler 10 may be single loop modes. Alternatively, at least one of the target pressure mode, the target force mode and the target weight mode may comprise a set of nested control loops wherein the control loop frequency of the nested loops increases from the innermost control loop towards the outermost control loop. Furthermore, according to embodiments of the present invention, the control loop frequencies at which the different PWM values are generated in accordance with the different control modes of the baler 10 may be equal, or they may be different.

In a baler 10 according to embodiments of the present invention, a weight factor is assigned to the various control modes of the baler 10. Each control mode of the baler 10 may have its own weight factor, the sum of the different weight factors being for example equal to 100%. Furthermore, according to embodiments of the present invention, the controller 58 is adapted to generate a final PWM value PWMfinal, which is determined as a function of the different PWM output values and the weights of the control modes by which the PWM output values are generated. The final PWM value PWMfinal may then be supplied to the settable restriction valve, e.g. the proportional solenoid valve 48, of the hydraulic circuit 40 for a controlled adjustment of the hydraulic actuator(s) 18.

Figure 9:
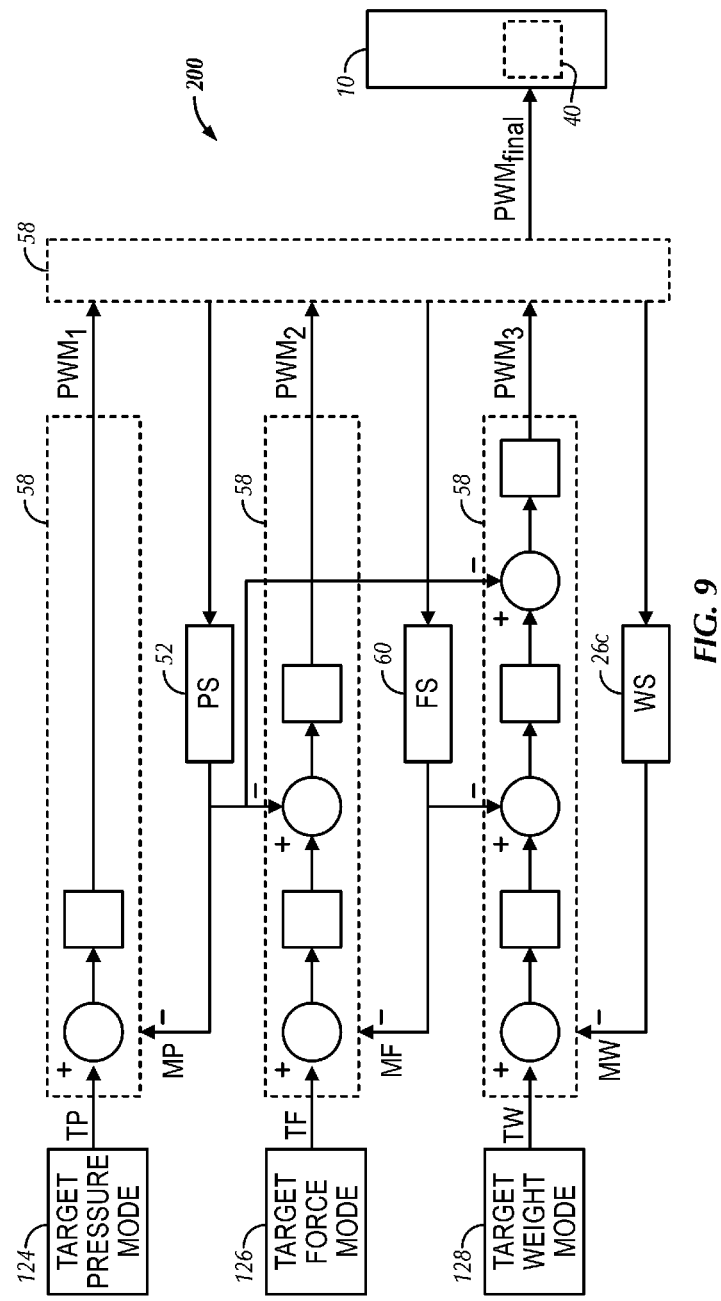
FIG. 9 is a schematic representation of a multi-mode control system for a rectangular baler according to embodiments of the present invention wherein the multi-mode control system comprises three different control modes.

FIG. 9 schematically illustrates a multi-mode control system 200 of a baler 10 according to embodiments of the present invention, wherein the baler 10 is operational in a target pressure mode 124, a target force mode 126 and a target weight mode 128. Each control mode of the baler 10 generates a different PWM output value (PWM1, PWM2 and PWM3 respectively). According to embodiments of the present invention, the target pressure mode 124 may for example be a single loop mode which utilizes the output value of a pressure sensor PS, for example pressure gauge 52, at a first sampling frequency to generate the PWM1 output value at a first control loop frequency, the control loop frequency of the pressure control mode. The target force mode 126 of the baler 10 may for example comprise two nested loops wherein the innermost loop utilizes the output value of the pressure sensor PS, e.g. pressure gauge 52, sampling at a first sampling frequency, and the outermost loop uses the output value of a force sensor FS, for example force sensor 60, sampling at a second sampling frequency lower than the first sampling frequency. For this embodiment, the control loop frequency of the innermost loop of control mode 126 is higher than the control loop frequency of the outermost loop of control mode 126 and equals the control loop frequency of the target pressure mode 124. The target weight mode 128 of the baler 10 may for example comprise three nested loops, wherein the innermost loop utilizes the output value of pressure gauge 52 sampling at the first sampling frequency, the middle loop uses the output value of force sensor 60 sampling at the second sampling frequency lower than the first sampling frequency, and the outermost loop uses the output value of a weight sensor WS, for example weight sensor 26c, sampling at a third sampling frequency lower than the second sampling frequency. In the embodiment illustrated in FIG. 9, the control loop frequencies of the target pressure mode, the target force mode and the target weight mode are the same and equal the first sampling frequency at which the pressure measurement, e.g. carried out by pressure gauge 52, takes place. This may for example be 5 Hz. The final PWM value (PWMfinal) generated by controller 58 may then be adjusted at the same frequency, using for example the following set of equations:

$$\begin{cases} PWM_{final} = X \cdot PWM_1 + Y \cdot PWM_2 + Z \cdot PWM_3 \\ X + Y + Z = 100\% \end{cases},$$

wherein X, Y and Z are the weight factors which are assigned to target pressure mode 124, target force mode 126 and target weight mode 128, respectively.

As a numerical example, a PWM1 output value of 50% based on a target pressure set by the operator may be generated in accordance with the target pressure mode 124, a PWM2 value of 75% based on a target force set by the operator may be generated in accordance with the target force mode 126, and a PWM3 value of 100% based on a target weight set by the operator may be generated in accordance with the target weight mode 128 of the baler 10. In one example, the operator may choose to work in pressure target mode 124 only, such that X would be set at 100% and Y and Z would be set at 0%. In this case, the final PWM value sent to the settable restriction valve, e.g. the proportional solenoid valve 48, of the hydraulic circuit 40 would be 50%. The user could also choose to work in a "mixed target weight/target force mode" multi-mode control system 200 in which both modes have equal weight. X would then be set to 0% and Y and Z to 50%. In this example the final PWM value sent to the settable restriction valve, e.g. proportional solenoid valve 48, would be 50%·75%+50%·100%=87.5%.

In an alternative embodiment of a multi-mode control system 200 of a baler 10 according to the present invention, the control loop frequencies of the target pressure mode, the target force mode and the target weight mode may be different from one another. For example, the target pressure mode of a multi-mode control system 200 according to embodiments of the present invention may be the target pressure mode 100 illustrated in FIG. 4, whereas the target force mode may be the target force mode 101 illustrated in FIG. 5 and the target weight mode may be the target weight mode 102 illustrated in FIG. 6. In that case, the PWM value PWM1 generated in accordance with the target pressure mode 100 of the baler 10 may be updated with a control loop frequency of for example 5 Hz or higher, whereas the PWM value PWM2 generated in accordance with the target force mode 101 may be updated with a control loop frequency of for example 0.8 Hz and the PWM value PWM3 generated in accordance with the target weight mode 102 may be updated with a control loop frequency of for example 0.02 Hz. In a particular embodiment of a baler 10 according to the present invention, the final PWM value PWMfinal generated by the controller 58 may then for example be updated at a frequency which equals the highest control loop frequency of the various control modes (e.g. 5 Hz), such that a regular update of the pressure in the hydraulic circuit 40 is obtained.

Figure 10:
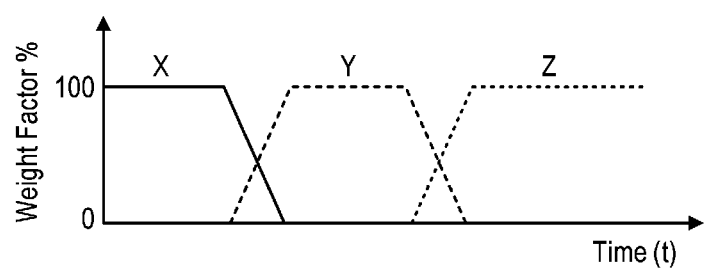
FIG. 10 illustrates one example of the time dependency of the weight factors X, Y and Z of a multi-mode control system according to embodiments of the present invention, which may for example be applied to a multi-mode control system as illustrated in FIG. 9.

According to embodiments of the present invention, the weight factors assigned to the various control modes of the baler 10 may be fixed during operation of the baler, or they may be varied over time. The weight factors may be varied either by the operator, or they may be varied by means of an automated program. In one embodiment of a baler 10 according to the present invention, the weight factors may be varied in such way that a gradual shift from one control mode to the other may be obtained. FIG. 10 illustrates one example of the time dependency of three weight factors X, Y and Z during operation of the baler 10. This time scheme may for example be applied to the multi-mode control system 200 as illustrated in FIG. 9. During start-up of the baler 10, when the bale-forming chamber 16 is still empty, the target pressure mode 124 could be applied to the baler 10 (X=100%; Y, Z=0%). The target pressure mode 124 could be maintained until sufficient material is available in the bale-forming chamber 16 to cause reliable readings on the force sensor 60. From that moment on, a gradual shift to the target force mode 126 could be executed (Y=100%; X, Z=0%). Finally, as sufficient bales have been weighed to achieve a reliable weight measurement, a gradual shift to the target weight mode 128 could be initiated (Z=100%; X, Y=0%).

Figure 11:
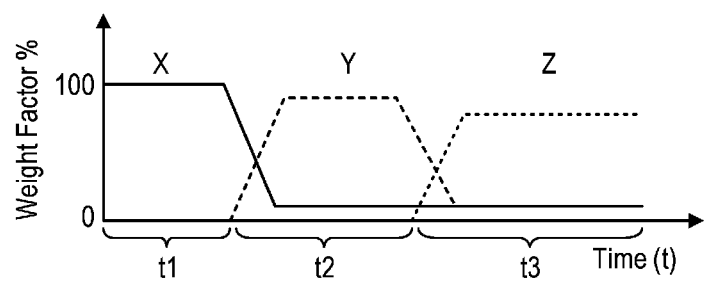
FIG. 11 illustrates an alternative example of the time dependency of the weight factors X, Y and Z of a multi-mode control system according to embodiments of the present invention, wherein the weight factors X, Y and Z are fixed to a non-zero value in course of time.

FIG. 11 illustrates an alternative example of the time dependency of the weight factors X, Y and Z of a multi-mode control system according to embodiments of the present invention. Rather than fixing weight factor X to 0% after a first time period t1 had elapsed, e.g. after start-up of the baler 10, weight factor X may be gradually decreased to a non-zero value, e.g. to a value between 5% and 20%, e.g. to 10%. At the same time, weight factor Y may be gradually increased from 0% to (100-X)%, for example to a value between 80 and 95%, for example to 90%. As such, the baler 10 can be operated in a "mixed target pressure/target force mode" during a second time period t2 of the baling process. Finally, when the second time period t2 has elapsed, e.g. when sufficient bales have been weighed to achieve a reliable weight measurement, the weight factor Y may be gradually decreased to a non zero-value, e.g. to a value between 5% and 20%, e.g. to 10%. At the same time, the target weight mode may be initiated by a gradual increase of the weight factor Z from 0% to (100-X-Y)%, e.g. to 80%. As such, the baler 10 can be operated in a "mixed target pressure/target force/target weight mode" during a third time period t3. This third time period t3 may for example run till the end of the baling process.

It is an advantage of a multi-mode control system 200 according to embodiments of the present invention that the baler 10 can be operated by means of a multi-mode control system, which offers nearly infinite possibilities to adapt the density control logic according to specific circumstances without giving up the tried and tested control strategies that are available to and known by current users.

While the invention has been illustrated and described in detail in the drawings and foregoing description, such illustration and description are to be considered illustrative or exemplary and not restrictive. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The foregoing description details certain embodiments of the invention. It will be appreciated, however, that no matter how detailed the foregoing appears in text, the invention may be practiced in many ways. It should be noted that the use of particular terminology when describing certain features or aspects of the invention should not be taken to imply that the terminology is being re-defined herein to be restricted to include any specific characteristics of the features or aspects of the invention with which that terminology is associated.

The invention claimed is:

1. A rectangular baler comprising:
   a biomass feeder duct connected to a bale-forming chamber;
   a piston that is reciprocatable in the bale-forming chamber to compress biomass fed into the bale-forming chamber via the biomass feeder duct to form bales and a bale discharge, the dimensions of part of the interior of the bale-forming chamber being adjustable under the influence of at least one actuator having controllable energization; and
   a controller for controlling the energization of the at least one actuator, the controller being adapted for generating a least a first control signal in accordance with a target pressure mode of the baler;
   a second control signal in accordance with a target force mode of the baler, and
   a third control signal in accordance with a target weight mode of the baler;
   wherein the target pressure mode uses a measured pressure value of a pressure sensor to generate the first control signal, the target force mode uses a measured force value of a force sensor to generate the second control signal, the target weight mode uses a measured weight value of a weight sensor to generate the third control signal;
   wherein the controller is adapted for determining a final control signal from at least the first control signal and a weight factor associated therewith, the second control signal and a weight factor associated therewith and the third control signal and a weight factor associated therewith, the final control signal being for use to control the energization of the at least one actuator of the rectangular baler.

2. A rectangular baler according to claim 1, wherein the sampling frequency of the pressure sensor is higher than the sampling frequency of the force sensor, and wherein the sampling frequency of the force sensor is higher than the sampling frequency of the weight sensor.

3. A rectangular baler according to claim 1, wherein the controller is adapted for determining the final control signal from at least the first, the second and the third control signal and their associated weight factors, such that the sum of the associated weight factors is 100%.

4. A rectangular baler according to claim 1, wherein the controller is such that the weight factors associated with the at least first, second and third control signals are fixed during operation of the baler.

5. A rectangular baler according to claim 1, wherein the controller is such that at least one of the weight factors associated with the at least first, second and third control signals varies over time during operation of the baler.

6. A rectangular baler according to claim 1, wherein a loop frequency of the target pressure mode, a loop frequency of the target force mode and/or and a loop frequency of a target weight mode are different from one another.

7. A multi-mode control system for controlling the density of bales formed by a rectangular baler, the multi-mode control system comprising:
a controller for generating a final control signal for controlling the energization of at least one actuator for adjusting the dimensions of part of the interior of a bale-forming chamber of a baler, wherein the controller is adapted for determining a final control signal from at least a first control signal generated in accordance with a target pressure mode of the baler and a weight factor associated therewith;
a second control signal generated in accordance with a target force mode of the baler and a weight factor associated therewith; and
a third control signal generated in accordance with a target weight mode of the baler and a weight factor associated therewith;
wherein the target pressure mode uses a measured pressure value of a pressure sensor to generate the first control signal, the target force mode using a measured force value of a force sensor to generate the second control signal, and the target weight mode using a measured weight value of a weight sensor to generate the third control signal.

8. A multi-mode control system according to claim 7, wherein the sampling frequency of the pressure sensor is higher than the sampling frequency of the force sensor, and wherein the sampling frequency of the force sensor is higher than the sampling frequency of the weight sensor.

9. A multi-mode control system according to claim 7, wherein at least one of the target pressure mode, the target force mode and the target weight mode is a single loop mode.

10. A multi-mode control system according to claim 7, wherein at least one of the target pressure mode, the target force mode and the target weight mode comprises a set of nested control loops, wherein the control loop frequency of the nested control loops decreases from the innermost loop towards the outermost loop.

11. A multi-mode control system according to claim 7, wherein the first control signal is generated by comparing a target pressure value to the measured pressure value, wherein the second control signal is generated by comparing a target force value to the measured force value, and wherein the third control signal is generated by comparing a target weight value to the measured weight value.

12. A multi-mode control system according to claim 7, wherein the control loop frequency of at least one of the target pressure mode, the target force mode and the target weight mode is different from that of the other control modes.

13. A multi-mode control system according to claim 11, wherein the target pressure mode is a single loop mode;
the target force mode comprises a target pressure loop nested in a target force loop, the control loop frequency of the target pressure loop being higher than the control loop frequency of the target force loop;
the target weight mode comprises a target pressure loop nested in a target force loop nested in a target weight loop, the control loop frequency of the three nested control loops of the target weight mode increasing from the innermost loop towards the outermost loop;
wherein the target pressure loop of the target force mode and the target weight mode use the measured pressure value of the pressure sensor, and wherein the target force loop of the target weight mode uses the measured force value of the force sensor.

14. A multi-mode control system according to claim 7, wherein the final control signal is generated using the equations:

$$\begin{cases} PWM_{final} = X \cdot PWM_1 + Y \cdot PWM_2 + Z \cdot PWM_3 \\ X + Y + Z = 100\% \end{cases}.$$

15. A method for controlling creation of constant density bales by means a baler, the method comprising the steps of:
generating with a control system at least a first control signal, a second control signal and a third control signal in accordance with a target pressure mode, a target force mode and a target weight mode, respectively, of the baler,
associating with the control system a first weight factor with the first control signal, a second weight factor with the second control signal, and a third weight factor with the third control signal,
determining with the control system a final control signal from the first, the second and the third control signals and their associated weights, and
sending the final control signal for controlling the density of bales created by baler, wherein the final control signal is transmitted by the control system to control the energization of at least one actuator that is configured to adjust the dimensions of part of an interior of a bale-forming chamber of the baler.

* * * * *